United States Patent
Skeet (10) Patent No.: US 8,351,495 B2
(45) Date of Patent: Jan. 8, 2013

(54) METHOD AND APPARATUS FOR DETECTING IN-BAND INTERFERENCE IN A DATA COMMUNICATIONS MODEM

(75) Inventor: David Skeet, Colchester (GB)

(73) Assignee: Teledyne Paradise Datacom, LLC, Thousand Oaks, CA (US)

( * ) Notice: Subject to any disclaimer, the term of this patent is extended or adjusted under 35 U.S.C. 154(b) by 651 days.

(21) Appl. No.: 12/557,177

(22) Filed: Sep. 10, 2009

(65) Prior Publication Data

US 2011/0058595 A1    Mar. 10, 2011

(51) Int. Cl.
*H03H 7/30* (2006.01)
*H03D 1/04* (2006.01)

(52) U.S. Cl. .......................... 375/232; 375/346; 375/376
(58) Field of Classification Search ................. 375/232, 375/346, 376
See application file for complete search history.

(56) References Cited

U.S. PATENT DOCUMENTS

| | | | |
|---|---|---|---|
| 5,471,500 A | 11/1995 | Blaker et al. | |
| 6,430,149 B1* | 8/2002 | Kobayashi | 370/208 |
| 2002/0161560 A1* | 10/2002 | Abe et al. | 702/196 |
| 2004/0056785 A1* | 3/2004 | Webster et al. | 341/61 |

FOREIGN PATENT DOCUMENTS

CA    2472319 A1    9/2003

* cited by examiner

*Primary Examiner* — David C. Payne
*Assistant Examiner* — Brian J Stevens
(74) *Attorney, Agent, or Firm* — McNees Wallace & Nurick LLC (57) ABSTRACT

A method and apparatus for detection and analysis of interference and noise in a received signal within a bandwidth of a predetermined communication channel. A receiver receives a modulated signal and generates a demodulated digital baseband signal. A digital quadrature demodulator receives the digital baseband data signal and demodulates the digital baseband data signal to generate complex digital signal soft-symbol decisions at its output at the received symbol rate. A processor interface in communication with the digital quadrature demodulator and the controller transfers data between the digital quadrature demodulator and the controller. The controller reconstructs a transmitted signal from the transferred data and subtracts the transmitted signal from the modulated signal to generate a third signal representative of noise and interference underlying the transmitted signal within a predetermined communications channel containing the transmitted signal. The modulated and third signals are displayed on a computer screen or a printout.

20 Claims, 4 Drawing Sheets

METHOD AND APPARATUS FOR DETECTING IN-BAND INTERFERENCE IN A DATA COMMUNICATIONS MODEM

BACKGROUND

The application relates generally to the field of wireless digital data communications. The application relates more specifically to the detection and analysis of interference and noise within the bandwidth of a predetermined communication channel.

In wireless digital data communications, in particular satellite communications, policing of data communications channels is performed for Quality of Service assurance and fault diagnosis purposes. For example, in-band interference can seriously degrade the demodulated Bit Error Ratio (BER) of a receiver. A stable, high-quality communication route avoids data loss. If a chosen communication path is error-prone, it is likely that the transmitted data may get corrupted or even lost. Generally, the lowest BER provides the highest level of Quality of Service (QoS).

In satellite digital communications, such in-band interference may arise for various reasons. A user may unintentionally interfere due to system configuration error or due to a satellite transponder frequency planning problem. In other cases, in-band interference may be due to malicious interference by another party, also referred to as signal jamming. Interference may also be self generated due to the presence of a non-linearity in the communications path. In other cases, poor antenna or Orthogonal Mode Transducer (OMT) alignment may result in insufficient cross-polarization rejection.

Sometimes, interference in a received signal can be obvious when viewed on a spectrum analyzer, especially if the interference is narrowband and has a relatively high power compared to the signal of interest. However, if the interference is broader band and has a low power level relative to the signal of interest, then the interference may not be readily perceptible on a spectrum analyzer. The disclosed systems and methods address the need for the latter case whereby low level in-band interference requires detection and analysis within a data communications modem receiver.

Digital systems transmit information as either 0s or 1s. Accurate information transmission depends upon being able to reliably detect transmitted 1s and 0s. Accurate detection is not always a simple matter because of factors such as low received signal power and multiple transmission paths caused by reflecting objects between the transmitter and receiver. Error correction techniques have been developed to increase the accuracy of digital communications systems. A digital information sequence which has been subject to error correction coding must be decoded at the receiver. An optimum maximum likelihood decoder, for this type of coding, determines a sequence of bits which has a maximum likelihood of being the sequence that was sent. The Viterbi algorithm is a maximum likelihood decoding scheme for use at a receiver where an information sequence has employed an encoder using convolution codes and the channel is an additive white Gaussian noise channel.

In general, channel decoding can be performed in two ways, hard-decision decoding or soft-decision decoding in a soft symbol, domain. Usually, samples of the demodulated signal are quantized resulting in bits so that, at the output of a demodulator, decoding can be performed in a bit-wise manner. In the hard bit domain, the demodulator quantizes each sample to one of two levels, i.e. 0 or 1, and is said to have made a hard-decision. The decoder that works with this kind of input is said to perform hard-decision decoding. On the other hand, if quantization is performed using more than two levels per bit, the resulting quantized samples are called soft symbols, or symbols. A soft symbol is the amplitude of the I and Q channel baseband outputs of the demodulator sampled at each symbol period. For example, when using Quadrature Phase Shift Keyed (QPSK) modulation, the demodulated soft symbols would ideally lie on or, in the presence of noise, reasonably close to, four points on the complex plane arranged in a square constellation. The decoder making use of the information in soft-symbols is performing soft-decision decoding. For example, U.S. Pat. No. 5,802,116 issued Sep. 1, 1998 to Baker et al. presents a method and apparatus for obtaining a soft symbol decoded output of a received signal by a two pass Viterbi operation. U.S. Pat. No. 6,760,438 issued Jul. 6, 2004 to Hui, et al. discloses a system and method for Viterbi decoding on encrypted data.

SUMMARY

One embodiment relates to a method for detection and analysis of interference and noise in a received signal within a bandwidth of a predetermined communication channel. The method includes complex down-conversion of the received signal to an in-phase and quadrature (IQ) sampled signal; low pass filtering and down-sampling the IQ sampled signal to generate a decimated IQ sampled signal having a sample rate commensurate with the bandwidth of the signal; storing at least a portion of the decimated IQ sampled signal in a first data storage element; extracting and recovering a symbol timing of the received decimated IQ sampled signal to generate a complex data stream having a sample rate twice that of the received symbol rate, and which is synchronized to coincide with symbol transition instants, and an estimate of the sample rate ratio between a received symbol rate and a decimated IQ sample rate; extracting and recovering a carrier phase and frequency offset using a carrier phase recovery and synchronization (CARS) digital phase locked loop, and generating soft symbol decisions delivered at the received symbol rate; capturing at least a portion of the soft symbol decisions from the CARS digital phase locked loop in a second data storage element; reading the first data storage element and obtaining a decimator data set and reading the second data storage element and obtaining a symbol decisions data set; generating hard symbol decisions based on the soft symbol decisions data set; increasing a sampling rate of the hard symbol set of data to generate up-sampled hard symbol data; filtering the up-sampled hard symbol data using data shaping filter characteristics employed in a transmitting modulator, the data shaping filter characteristics being provided in the demodulator and cancellation algorithm; interpolating the up-sampled and filtered data to an effective sample rate, the effective sample rate being substantially equal to that of the decimator data set, the required interpolating factor being known from the sample rate ratio available from the symbol timing recovery and synchronization digital phase locked loop; adjusting a signal level of the interpolated signal set to achieve amplitude parity with that of the decimator data set; estimating a relative delay, in samples, between the interpolated CARS data and the decimator data set by correlating the decimator data set with the interpolated symbol decision data set; adaptively equalizing the decimator data set to correlate with the interpolated CARS data set in time, amplitude, and phase so as to produce a set of taps for an equalizing filter; convolving the equalizing filter taps with the decimator data set to produce an equalized decimator data set; and cancelling the interpolated CARS data set from the equalized decimator data set to obtain a residue signal containing the received noise and interference.

Another embodiment relates to a data communications modem including a receiver, a digital quadrature demodulator, a processor interface, and a controller. The receiver is arranged to receive a modulated signal and process the modulated signal to generate a demodulated digital baseband signal. The digital quadrature demodulator receives the digital baseband data signal at an input and demodulates the digital baseband data signal to generate a set of complex in-phase and quadrature sampled digital signal soft-symbol decisions at its output at a received symbol rate. The processor interface communicates with the digital quadrature demodulator and the controller and transfers data, including received complex baseband signal samples and demodulated soft symbol decisions, between the digital quadrature demodulator and the controller. The controller is configured to reconstruct a replica of the transmitted signal from the transferred soft symbol decisions and subtract the replica transmitted signal from the received complex baseband signal samples to generate a third signal representative of the noise and interference underlying the received signal within a predetermined communications channel containing the received signal.

Intended advantages of the disclosed systems and/or methods satisfy one or more of these needs or provide other advantageous features. Other features and advantages will be made apparent from the present specification. The teachings disclosed extend to those embodiments that fall within the scope of the claims, regardless of whether they accomplish one or more of the aforementioned needs.

Alternative exemplary embodiments relate to other features and combinations of features as may be generally recited in the claims.

DETAILED DESCRIPTION OF THE EXEMPLARY EMBODIMENTS

The present disclosure provides a method of detecting the presence of interfering signals within the bandwidth of a wanted communications channel occupying the same channel bandwidth, and a digital satellite communication modem for implementing the disclosed method. The method and apparatus enable monitoring of data communications channels for Quality of Service assurance and fault diagnosis purposes. In one embodiment a satellite communications modem receiver is equipped with a digital quadrature demodulator to extract the communicated data from the received modulated signal. The digital quadrature demodulator is equipped with either Field Programmable Gate Array (FPGA) or Application Specific Integrated Circuit (ASIC) semiconductor devices. The digital quadrature demodulator is augmented with sufficient data storage capacity to simultaneously capture a large number of complex in-phase and quadrature (IQ) baseband samples and a similar number of demodulated soft-symbol decisions, in two separate digital memories. Data from the two signal streams may be captured in a manner that does not disrupt data traffic flow though the modem receiver. The two sets of data can be read by a microprocessor or digital signal processor. An algorithm running on the processor then uses the data to cancel the wanted signal component from the total received signal to leave a residual signal, wherein the wanted signal is that which was communicated by the transmitter.

The total received signal and the residual signal obtained after cancellation are further processed to show their respective power spectra. In so doing, the presence of interfering signals that share the same bandwidth as the signal of interest may be revealed. The invention enables the analysis and observation of signals interfering with the wanted signal that would otherwise be imperceptible, yet sufficient to degrade the performance of the communications link. The modem, equipped with an Ethernet interface, communicates the spectral data to a web-based user interface operating on either a local or remote computer.

Figure 1:
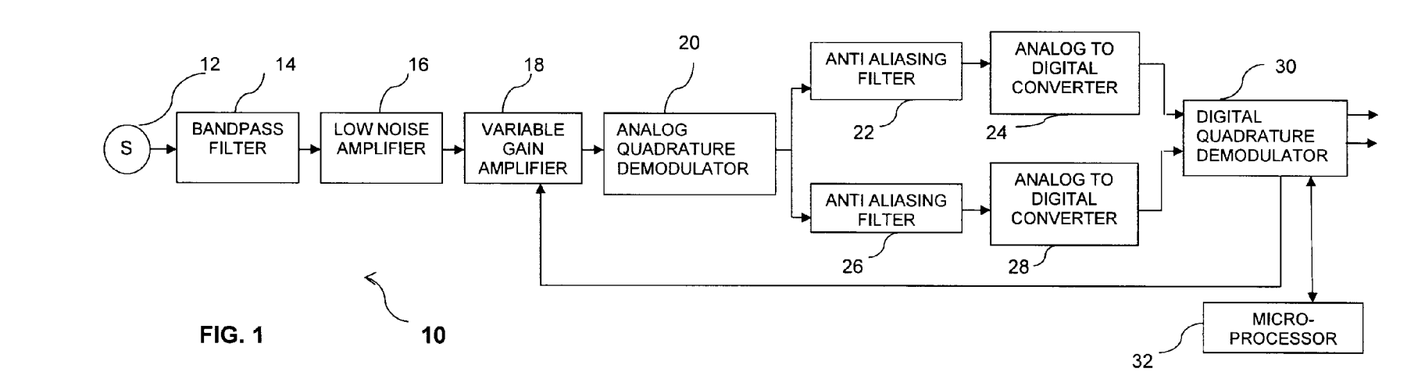
FIG. 1 shows an exemplary architecture of a typical direct-conversion receiver for a satellite digital communications modem.

Generally, a satellite modem receiver incorporates a demodulator for the purpose of recovering symbols from a modulated received carrier. Examples of modulation schemes include phase shift keying (PSK), quadrature amplitude modulation (QAM), and asymmetric phase-shift keying or amplitude and Phase-shift keying (APSK), although the disclosed invention is not limited to these specific modulation types. Recently, it has become commonplace to implement demodulator functionality digitally, for example, using FPGA or ASIC devices. Referring to FIG. 1, modem receiver 10 can receive an Intermediate Frequency (IF) or Radio Frequency (RF) signal 12. IF or RF signal 12 is filtered by bandpass filter 14 that selectively passes a frequency band of interest. The signal is then amplified by a low noise amplifier 16 and input to a variable gain amplifier 18 for adjusting the gain and further amplifying the signal. The gain control of the VGA can be implemented by a baseband amplitude detection circuit in front end of the Digital Quadrature Demodulator 30 so as to form an Automatic Gain Control (AGC) for the receiver. Following the amplification stages, the signal is passed to an analog quadrature demodulator 20. Analog quadrature demodulator 20 down-converts the signal to approximately baseband frequency to generate a complex in-phase and quadrature sampled (IQ) signal. Next, the IQ signal, comprising a real component (I) and an imaginary component (Q), is input to anti-aliasing filters 22, 26 which are arranged in parallel paths. The first anti-aliasing filter 22 filters the I component of the IQ signal, and the second anti-aliasing filter 26 filters the Q component of the signal. Both I and Q signals are then converted to digital format using a pair of analog to digital (A to D) converters 24, 28, respectively. This architecture is sometimes referred to as a direct-conversion stage because the IF or RF modulated signal is converted directly to baseband in one hop.

The A to D converters 24, 28 then feed the converted signal to a pair of inputs to a digital quadrature demodulator 30, to extract symbol timing and a carrier phase reference from the modulated signal. Once the symbol timing and a carrier phase reference data are extracted from the modulated signal, digital quadrature demodulator 30 uses the data to determine the state of each symbol received.

Figure 2:
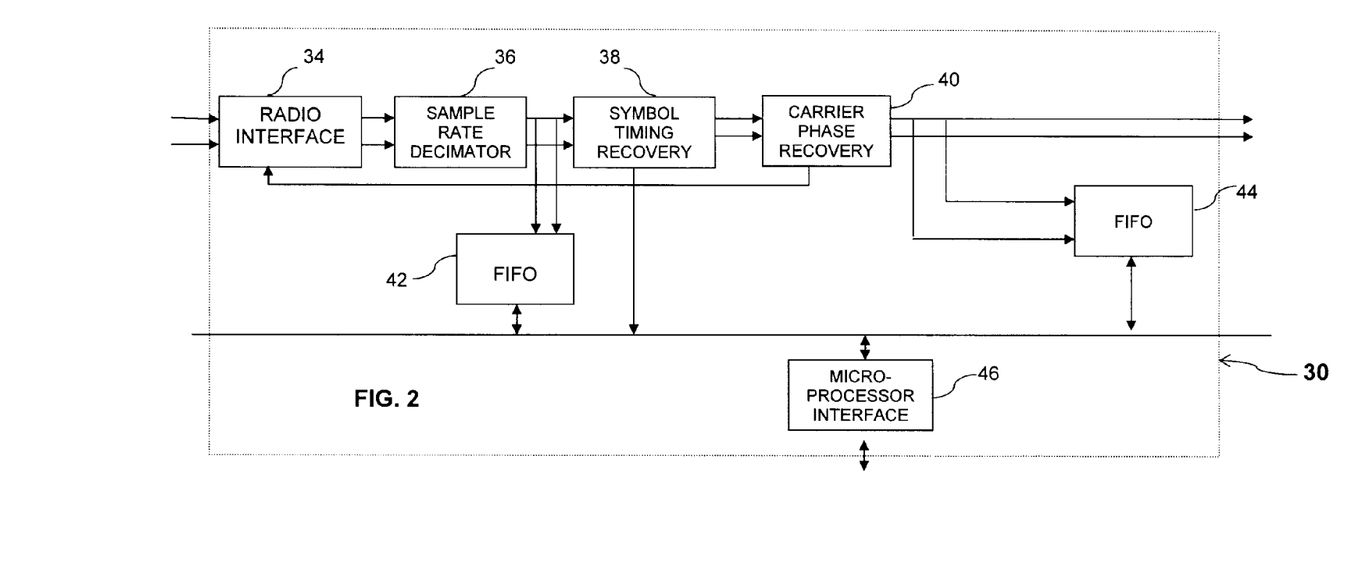
FIG. 2 shows a block diagram of a baseband digital quadrature demodulator.

Referring next to FIG. 2, a block diagram of the exemplary digital quadrature demodulator 30 is shown. As described above, the received signal is provided to digital quadrature demodulator 30 after processing by A to D converters 24, 28. In the digital quadrature demodulator, a Radio Interface (RIF) 34 controls the front end analog Automatic Gain Control (AGC) and removes signal impairments such as DC offsets and IQ amplitude imbalance. RIF 34 quadrature tunes the wanted carrier to baseband given carrier phase and frequency correction information acquired from the Carrier Phase Recovery block 40. Next, sample rate decimator (DEC) block 36 performs low pass filtering and subsequent sample rate decimation, or down-sampling to a reduced sampling rate to achieve a sample rate commensurate with the bandwidth of the signal. A symbol timing recovery digital phase locked loop (TIM) block 38 then provides matched filtering and further sample rate decimation to twice that of the symbol rate. The sampling instants coincide with symbol transition instants and mid-symbol period instants. A carrier phase recovery and synchronization (CARS) block 40 is provided at the output of TIM 38. CARS block 40 removes substantially all phase and frequency offsets from the received signal and ensures the output constellation associated with the symbol decisions is oriented correctly and is stationary, thereby enabling downstream forward error correction decoders to decode the received signal.

The received signal from the satellite includes the wanted signal (that is the modulated signal of interest), additive white Gaussian noise and potentially interference. In order to observe the unwanted signal components, i.e., the noise and any interference, it is necessary to remove the wanted signal component, since the wanted signal component is likely to have a significantly higher power level than the unwanted signal components. As described below, the digital satellite modem acquires sample data from the quadrature demodulator's receive path and processes the sample data off-line using a microprocessor or Digital Signal Processor, to cancel the wanted signal from the received signal to permit observation of low level unwanted signals within the channel bandwidth.

The digital quadrature demodulator 30 is augmented with two first-in, first out buffer memories or FIFO's 42, 44 to capture and store baseband samples and soft-symbol decisions simultaneously. The first FIFO 42 captures data from the output of the decimator block 36, and the second FIFO 44 captures symbol decision data from the output of the CARS 40. It will be appreciated by those having skill in the art that the FIFO memories 42, 44 observe the data path signals, yet they do not form part of the data path. In this manner, interference detection does not interrupt the modem receiver from processing data traffic signals. The microprocessor 32 is also in data communication with symbol timing recovery block 38 through microprocessor interface 46. Microprocessor interface 46 allows microprocessor 32 to read the rate ratio between DEC 36 output and the symbol rate. The rate ratio is used later in the signal processing algorithm described below. The symbol decision data from the second FIFO 44 is used to derive an estimate of the received wanted signal, without any noise or interference. In effect, the transmitted baseband signal can be re-synthesized in the method 100 to a high degree of accuracy that is not enjoyed by other methods. This is because the demodulator and the cancellation algorithm both have a prior knowledge of the exact transmitter filtering characteristics, since the receiving and transmit data shaping filters are precisely matched within modem equipment of the same manufacturer and represents a unique and defining benefit in cancellation performance between this and prior art. Note that both the carrier recovery and symbol timing loops of the digital quadrature demodulator 30 must be synchronized to the desired carrier. Otherwise, the symbol decision data at the output of digital quadrature demodulator 30 can be erroneous, thus preventing replication of the transmitted baseband signal. If the re-synthesized transmitted baseband signal is then correlated accurately in sample rate, time, amplitude and phase with respect to the received signal as stored in FIFO 42, the wanted signal component in the received signal can be removed by cancellation, that is, by subtracting the re-synthesized transmitted baseband signal from the received signal. The signal that remains after cancellation will contain noise, interference, if any, and/or any part of the wanted signal that could not be cancelled.

Figure 3:
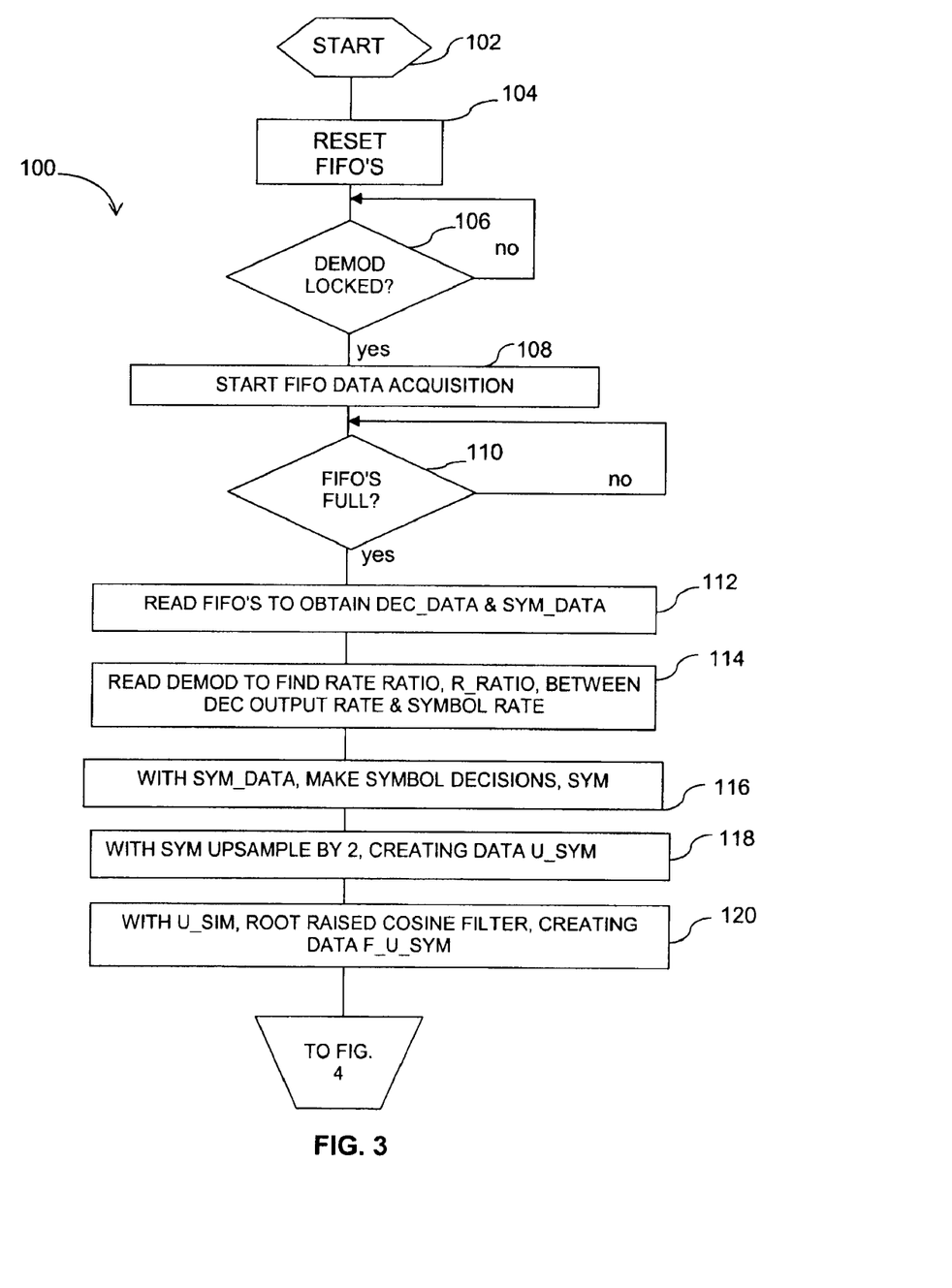
FIGS. 3 and 4 show a flowchart describing the signal processing operations used by the invention to extract the noise and interference signals from the total received signal and to make available spectral information for display on a local or remote computer.

Referring next to FIG. 3, once data is available in FIFO's 42, 44, the data is read from digital quadrature demodulator 30 by microprocessor 32. Microprocessor 32 is configured to perform the method 100 as follows:

First, the method 100 is started at step 102. Next, at step 104, FIFOs 42, 44 are reset. In this step the system initializes FIFOs 42, 44 in demodulator 30 to prepare for the capture of baseband sample and symbol decision data. The method 100 then proceeds to step 106, a decision block, in which method 100 determines if digital quadrature demodulator 30 is locked. If yes, the method 100 proceeds to step 108, otherwise method 100 returns to step 106 and continues to test until the demodulator is locked. In step 108, method 100 captures DEC and CARS output samples and stores the DEC and CARS output samples in FIFOs 42, 44. The method 100 then proceeds to step 110 to determine if FIFOs 42, 44 are full. If FIFOs 42, 44 are not yet full, the method 100 continues to check until FIFOs 42, 44 are full. If yes, method 100 proceeds to step 112 and reads FIFOs 42, 44 to obtain decimator and symbol decisions data. The method 100 then proceeds in step 114, to read digital quadrature demodulator 30 to determine the sample rate ratio between DEC and CARS outputs. The rate ratio may be provided by the symbol timing recover block 38 of the demodulator 30. Next, the method 100 proceeds to step 116, to make symbol decisions from the CARS samples. That is, the system estimates the transmitted symbols from the symbol decisions data. In so doing, noise in the soft symbol decisions is removed. Next, in step 118, method 100 increases the sampling rate, or up-samples, by 2. Then in step 120, using data created in step 118, the up-sampled data are filtered with a Root-Raised Cosine (RRC) filter having the same filter taps as those used by the modulator that transmitted the signal to the receiver. The transmit filter characteristics are provided to the receiver since it is important for the receiver filter to match precisely with the transmit filter for optimum BER performance. If the receiving and transmitting modems are from the same manufacturer, the receiver modem filtering can be made to match exactly with that of the transmitting modem filtering. In contrast to the prior art, this invention exploits this property to optimize the cancellation performance algorithm. Full knowledge of the transmit filtering ensures that a replica of the transmit baseband signal can be precisely reconstructed by the algorithm, thereby ensuring optimal cancellation performance in the algorithm and concomitant detection of underlying noise and interference. After RRC filtering, method 100 has a local copy of the baseband transmitted signal without noise. The effective sample rate of this stream is two samples per symbol. The local copy of the transmitted signal may not be a perfect replica of the transmitted baseband waveform as some of the symbol decisions made in step 116 may be incorrect due to the presence of noise and possibly interference, however this amount of distortion is negligible and does not significantly diminish the effectiveness of the algorithm.

Figure 4:
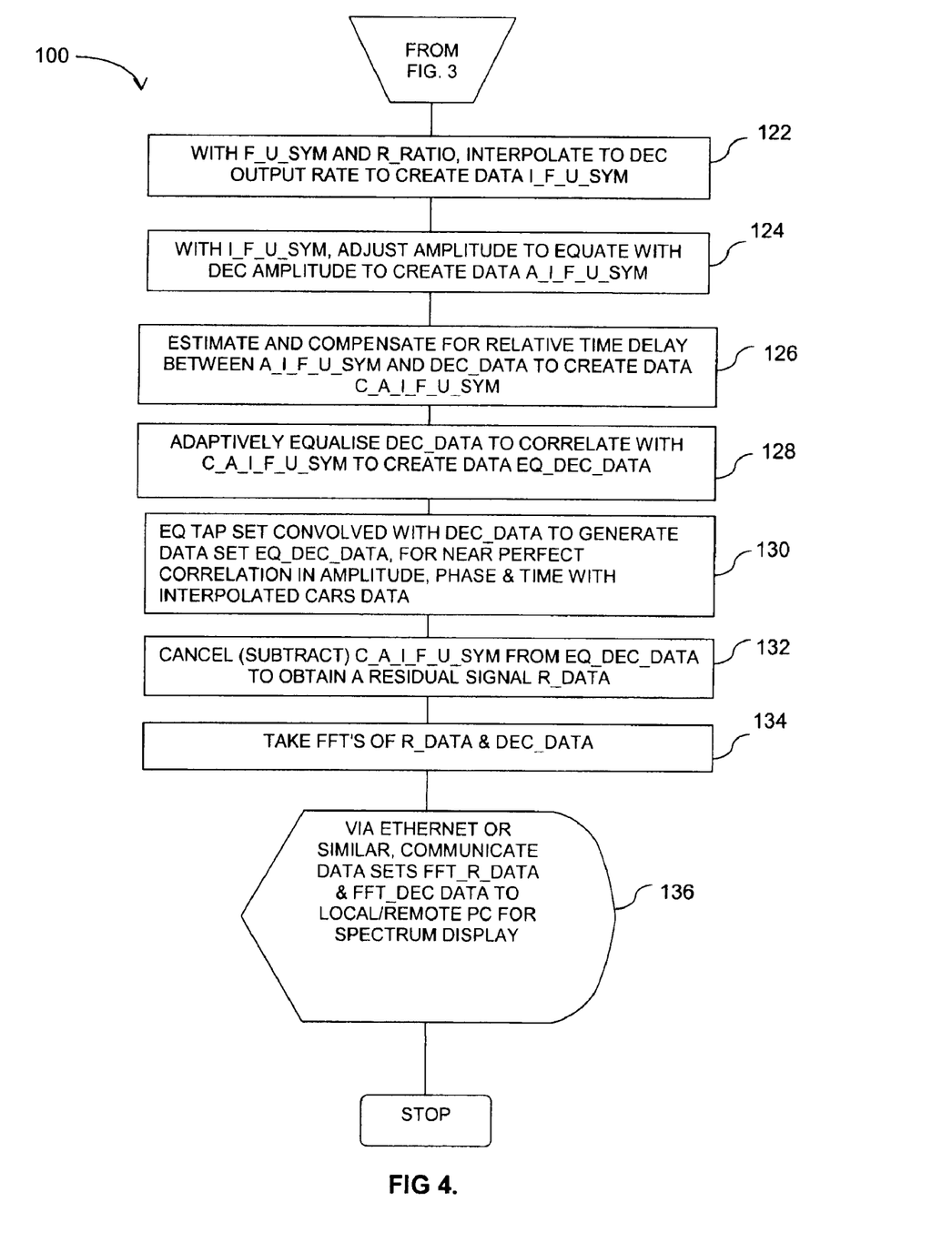

Referring next to FIG. 4, the method proceeds from step 120 (FIG. 3) to step 122, and in step 122 interpolates the data set from step 120 to the DEC output rate. The system then proceeds to step 124 to apply gain/attenuation to the data resulting from step 122 to adjust the signal level to approximately the same level as that at the DEC output. Step 124 serves as a first pass at correlating the two signals in amplitude, i.e., the output data from the decimator (DEC) and the up-sampled and filtered hard symbols derived from the CARS output soft symbols. Next, in step 126, method 100 estimates the relative delay in samples between the interpolated CARS data resulting from step 124 and the DEC data acquired in step 112. In the disclosed embodiment the delay estimation is performed using fast Fourier transform (FFT) circular correlation techniques. Using the measured value of relative delay between the two streams, a compensating delay is added to the DEC samples to ensure substantial time alignment with the interpolated CARS data resulting from step 124. Step 126 serves as a first pass at correlating the two signals in time.

In step 128, method 100 applies an adaptive equalizer algorithm to derive filter taps allowing the DEC data to be precisely correlated with the interpolated CARS data. In one embodiment, the adaptive equalizer may be a 7-tap least mean square (LMS) adaptive equalizer. LMS algorithms are used in adaptive equalization filters to find the filter coefficients that minimize the mean squared error signal, where the error signal is the difference between the desired (in this example, the interpolated CARS data samples) and the actual signal (in this example, the DEC data samples). Next, in step 130, the equalizer tap set from step 128, is convolved with the DEC data to produce a signal having near-perfect correlation in amplitude, time and phase with the interpolated CARS data resulting from step 124. Then in step 132, cancellation, or subtraction is performed, whereby the interpolated CARS data resulting from step 124 is subtracted from correlated signal obtained from step 130 resulting in a residue signal containing the received noise and interference.

Next, in step 134, method 100 performs FFTs on both the DEC data obtained in step 108, and the residue signal containing the noise and interference signals only from step 132. The FFT data are further processed in step 134 to obtain power spectra of the two signals. Then, in step 136, the power spectra data of the two signals obtained in step 134 are communicated to a computer (not shown) for graphical display of the acquired spectra of the received signal in its totality and separately the spectrum of the only the underlying noise and interference associated with the same received signal. The computer may be local or remote.

Figure 5:
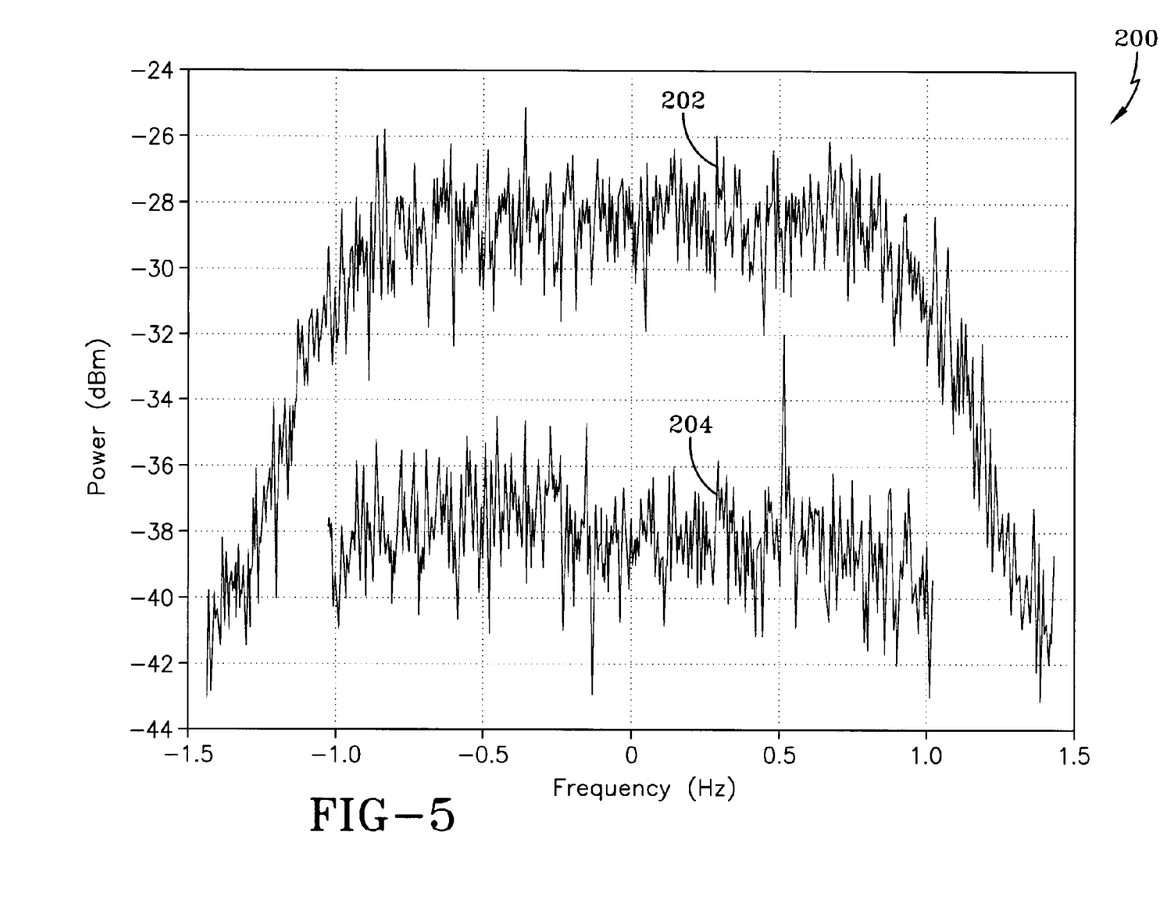
FIG. 5 shows a typical spectral plot of the total received signal seen by the receiver of a satellite data communications modem together with a plot of the spectrum of the noise and interference underneath the carrier.

An example display 200 of spectrum produced by the algorithm is shown in FIG. 5. In the example shown in FIG. 5, satellite digital communications receiver 10 is equipped with the augmented digital demodulator algorithms described above. The satellite digital communications receiver 10 receives a Quadrature Phase Shift Keyed (QPSK) modulated signal 202. The received signal 202 had a symbol rate of 2048 ksym/s and had a signal to noise ratio ($E_s/N_o$) of approximately 10 dB. A tonal interferer signal 204 is present in the received signal 202. The tonal interferer signal 204 is located at a frequency offset of +510 kHz relative to the center frequency. The spectral displays in FIG. 5 show the total received signal 202 on top of the underlying in-band noise and interference signal 204. Note that it is not possible to observe the presence of the interferer 204 within the top spectrum display 202, a spectrum that could be produced by a conventional orthodox spectrum analyzer. The algorithm described above has revealed the presence of the interference signal 204, including noise, and clearly shows the spectral properties and relative power levels of each.

It should be understood that the application is not limited to the details or methodology set forth in the following description or illustrated in the figures. It should also be understood that the phraseology and terminology employed herein is for the purpose of description only and should not be regarded as limiting.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

The present application contemplates methods, systems and program products on any machine-readable media for accomplishing its operations. The embodiments of the present application may be implemented using an existing computer processors, or by a special purpose computer processor for an appropriate system, incorporated for this or another purpose or by a hardwired system.

As noted above, embodiments within the scope of the present application may include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the figures herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the application. Likewise, software implementations could be accomplished with standard programming techniques with rule based logic and other logic to accomplish the various connection steps, processing steps, comparison steps and decision steps.

Glossary of Program Variables for FIGS. 3 & 4:

| Variable Name | Description |
| --- | --- |
| DEC_DATA | Decimated Data Set |
| SYM_DATA | Symbol Data Set |
| R_RATIO | Rate Ratio (Between the DEC_DATA and SYM DATA) |

| Variable Name | Description |
| --- | --- |
| U_SYM | Up-sampled Symbol Data Set |
| F_U_SYM | Filtered and Up-sampled Symbol Data Set |
| I_F_U_SYM | Interpolated, Filtered and Up-sampled Symbol Data Set |
| A_I_F_U_SYM | Amplitude adjusted, Interpolated, Filtered and Up-sampled Symbol Data Set |
| C_A_I_F_U_SYM | Compensated, Amplitude adjusted, Interpolated, Filtered and Up-sampled Symbol Data Set |
| EQ_DEC_DATA | Equalized Decision Data Set |
| R_DATA | Residual Data Set |
| FFT_R_DATA | Fast Fourier Transform of Residual Data Set |
| FFT_DEC_DATA | Fast Fourier Transform of Decision Data Set |

What is claimed is:

1. A method for detection and analysis of interference and noise in a received signal within a bandwidth of a predetermined communication channel, the method comprising:

complex down-conversion of the received signal to an in-phase and quadrature (IQ) sampled signal;

low pass filtering and down-sampling the IQ sampled signal to generate a decimated IQ sampled signal having a sample rate commensurate with the bandwidth of the signal;

storing at least a portion of the decimated IQ sampled signal in a first data storage element;

extracting and recovering a symbol timing of the received decimated IQ sampled signal to generate a complex data stream having a sample rate twice that of the received symbol rate, and which is synchronized to coincide with symbol transition instants, and an estimate of the sample rate ratio between a received symbol rate and a decimated IQ sample rate;

extracting and recovering a carrier phase and frequency offset using a carrier phase recovery and synchronization (CARS) digital phase locked loop, and generating soft symbol decisions delivered at the received symbol rate;

capturing at least a portion of the soft symbol decisions from the carrier phase recovery and synchronization (CARS) digital phase locked loop in a second data storage element;

reading the first data storage element and obtaining a decimator data set and reading the second data storage element and obtaining a symbol decisions data set;

generating hard symbol decisions based on the soft symbol decisions data set;

increasing a sampling rate of the hard symbol set of data to generate up-sampled hard symbol data;

filtering the up-sampled hard symbol data using data shaping filter characteristics employed in a transmitting modulator, the data shaping filter characteristics being provided in the demodulator and cancellation algorithm;

interpolating the up-sampled and filtered data to an effective sample rate, the effective sample rate being substantially equal to that of the decimator data set, the required interpolating factor being known from the estimate of the sample rate ratio available from the symbol timing recovery and synchronization digital phase locked loop;

adjusting a signal level of the interpolated signal set to achieve amplitude parity with that of the decimator data set;

estimating a relative delay, in samples, between the interpolated CARS data and the decimator data set by correlating the decimator data set with the interpolated symbol decision data set;

adaptively equalizing the decimator data set to correlate with the interpolated CARS data set in time, amplitude, and phase so as to produce a set of taps for an equalizing filter;

convolving the equalizing filter taps with the decimator data set to produce an equalized decimator data set; and cancelling the interpolated CARS data set from the equalized decimator data set to obtain a residue signal containing the received noise and interference.

2. The method of claim 1, further comprising:
obtaining a power spectra of the decimator data set and the residue signal based on FFTs of the decimator data set and the residue signal and communicating the power spectra to a computer for graphical display of the decimator data set and the residue signal.

3. The method of claim 1, wherein the step of downsampling the received signal to an in-phase and quadrature (IQ) sampled signal comprises capturing a stream of decimator (DEC) output samples and storing at least a portion of the captured decimator samples.

4. The method of claim 1, wherein the step of determining a sample rate ratio is based on an estimate of the sample rate ratio available in the symbol timing recovery and synchronization digital phase locked loop.

5. The method of claim 1, wherein the step of adjusting a signal level comprises adjusting the signal level to approximately the same level as a signal level at an output of the decimator.

6. The method of claim 1, wherein the step of correlating the decimator data set comprises inserting a relative delay to the decimator data set to compensate for the delay between the decimator data set and the interpolated symbol decisions data set.

7. The method of claim 1, wherein the step of convolving the symbol decisions data set with the decimator data set generates a reproduced signal substantially correlated in amplitude, time and phase with the interpolated symbol decisions data.

8. The method of claim 1, wherein each data storage element is a FIFO storage element.

9. The method of claim 1, wherein the step of extracting and recovering a symbol timing of the received decimated IQ sampled signal is implemented by a symbol timing recovery and a synchronized digital phase locked loop.

10. The method of claim 1, wherein the step of estimating a relative delay is implemented using FFT circular correlation techniques.

11. The method of claim 1, wherein the step of equalizing is implemented by applying a least-mean-square adaptive equalizer to derive filter taps.

12. A data communications modem comprising:
a receiver, a digital quadrature demodulator, a processor interface, and a controller;
the receiver configured to receive a modulated signal and process the modulated signal to generate a demodulated digital baseband signal;
the digital quadrature demodulator configured to receive the digital baseband data signal at an input and demodulate the digital baseband data signal to generate a complex in-phase and quadrature sampled digital signal soft-symbol decisions at its output at a received symbol rate; and the processor interface in data communication with the digital quadrature demodulator and the controller to transfer data, including received complex baseband signal samples and demodulated soft symbol decisions, between the digital quadrature demodulator and the controller; and the controller configured to reconstruct a replica of the transmitted signal from the transferred soft symbol decisions and subtract the replica of the transmitted signal from the received complex baseband signal samples to generate a third signal representative of noise and interference underlying the transmitted signal within a predetermined communications channel containing the transmitted signal.

13. The data communications modem of claim 12, wherein the receiver further comprises:

a bandpass filter to selectively pass a predetermined frequency range within the modulated signal, a low-noise amplifier to amplify the portion of the modulated signal passing from the bandpass filter, a variable gain amplifier to further amplify and vary the gain of the modulated signal; an analog quadrature demodulator to generate a complex in-phase and quadrature sampled (IQ) signal for input to a pair of anti-aliasing filters, the anti-aliasing filters arranged in parallel paths, a first anti-aliasing filter configured to filter a first component of the IQ signal, and the second anti-alias filter configured to filter a Q component of the signal; a pair of analog to digital converters wherein each of the I and Q signals are converted to digital format to input to the digital quadrature demodulator.

14. The data communications modem of claim 13, wherein the digital quadrature demodulator comprises:

a radio interface block, the radio interface block configured to digitally interface with a baseband output of the receiver via said pair of analog to digital converters and adjust a baseband input signal level of the receiver to a predetermined threshold, and to quadrature tune the wanted carrier to baseband given carrier phase and frequency correction information acquired from the digital quadrature demodulator.

15. The data communications modem of claim 12, wherein the digital quadrature demodulator further comprises:

a decimator block comprising complex baseband input interfaces with the radio interface block, the decimator block configured to reduce an input sample rate of the received signal to a lower sample rate commensurate with the bandwidth of a carrier being demodulated.

16. The data communications modem of claim 15, wherein the digital quadrature demodulator further comprises:

a first data capture block configured to acquire baseband complex samples from the decimator block and to store the baseband complex samples for reading by the controller.

17. The data communications modem of claim 16, wherein the digital quadrature demodulator further comprises: a second data capture block configured to acquire soft symbol decisions from the output of the carrier recovery and synchronization block and to store the soft symbol decisions for reading by the controller.

18. The data communications modem of claim 12 wherein said digital quadrature demodulator further comprises:

a timing recovery digital phase locked loop block having complex baseband input interfaces to interface with a complex baseband output of the decimator block, the timing recovery digital phase locked loop block configured to extract and align and synchronize a symbol timing clock with respect to the received signal and to filter the received signal to maximize a power ratio between the transmitted signal and the third signal; and to provide an estimated sample rate ratio between the output sample rate of said decimator block and the received symbol rate.

19. The data communications modem of claim 12, wherein said digital quadrature demodulator further comprises:

a carrier recovery and synchronization block having a complex baseband input interface to interface with the complex baseband interface of the timing recovery digital phase locked loop block, the carrier recovery and synchronization block configured to extract frequency and phase error estimations from a soft symbol decisions output generated by the said timing recovery digital phase locked loop block; and to control a digital phase locked loop to quadrature tune the demodulated signal to baseband and to output the soft symbol decisions.

20. The data communications modem of claim 12, wherein the processor interface is configured to provide configuration control, status monitoring, information gathering and further processing of said gathered information.

* * * * *